United States Patent
Nati et al.

(10) Patent No.: US 10,309,333 B2
(45) Date of Patent: Jun. 4, 2019

(54) CONTROL APPARATUS AND METHOD FOR AFTER-TREATMENT SYSTEM REGENERATION

(71) Applicant: GM GLOBAL TECHNOLOGY OPERATIONS LLC, Detroit, MI (US)

(72) Inventors: Giorgio Nati, Turin (IT); Paolo Olmo, Turin (IT); Nicola Pio Sacco, Turin (IT); Davide Gessaroli, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 97 days.

(21) Appl. No.: 15/721,245

(22) Filed: Sep. 29, 2017

(65) Prior Publication Data

US 2019/0101076 A1   Apr. 4, 2019

(51) Int. Cl.
| | |
|---|---|
| *F01N 3/20* | (2006.01) |
| *F02D 41/28* | (2006.01) |
| *F02D 41/02* | (2006.01) |
| *F02D 9/10* | (2006.01) |
| *F02D 41/14* | (2006.01) |

(52) U.S. Cl.
CPC ............. *F02D 41/28* (2013.01); *F02D 9/105* (2013.01); *F02D 41/027* (2013.01); *F02D 41/1401* (2013.01); *F02D 2041/1415* (2013.01); *F02D 2041/288* (2013.01)

(58) Field of Classification Search
CPC .. F02D 41/027; F02D 41/0275; F02D 41/029; F02D 41/405; F01N 3/0482; F01N 2430/06; F01N 2560/025
See application file for complete search history.

(56) References Cited

U.S. PATENT DOCUMENTS

| | | | | |
|---|---|---|---|---|
| 2007/0266700 | A1* | 11/2007 | Lang | ................... F02D 41/1454 60/285 |
| 2010/0256894 | A1* | 10/2010 | Yasui | ................... F02D 41/0235 701/108 |

FOREIGN PATENT DOCUMENTS

| | | | | |
|---|---|---|---|---|
| DE | 102004032537 A1 * | 1/2006 | ......... | F02D 41/3064 |
| DE | 102014218032 A1 * | 3/2016 | ......... | F02D 41/1401 |
| WO | WO-2010060503 A1 * | 6/2010 | ........... | F01N 3/0842 |

* cited by examiner

*Primary Examiner* — Jonathan R Matthias
(74) *Attorney, Agent, or Firm* — Lorenz & Kopf, LLP

(57) ABSTRACT

A method and apparatus is provided for regenerating an after-treatment device associated with an exhaust system of an internal combustion engine. A lambda error control provides a lambda error signal based upon a measured lambda value and a predetermined lambda value indicative of rich operation. An after-injection map provides an after-injection preset based upon a speed and a torque of the internal combustion engine. A main injection map provides a torque-making main injection preset based upon the speed of the internal combustion engine and the torque of the internal combustion engine. A controller is configured to provide an after-injection quantity signal based upon the after-injection preset, the lambda error signal and a main injection quantity signal based upon the main injection preset and the lambda error signal such that the measured lambda value is maintained within a regeneration range.

20 Claims, 3 Drawing Sheets

CONTROL APPARATUS AND METHOD FOR AFTER-TREATMENT SYSTEM REGENERATION

TECHNICAL FIELD

The technical field relates to a control apparatus and method for operating an internal combustion engine, and more particularly, to a control apparatus and method for regenerating an after-treatment system in an internal combustion engine.

BACKGROUND

An internal combustion engine for a motor vehicle generally includes an engine block defining at least one cylinder accommodating a reciprocating piston coupled to rotate a crankshaft. The cylinder is closed by a cylinder head that cooperates with the reciprocating piston to define a combustion chamber. A fuel and air mixture is cyclically disposed in the combustion chamber and ignited, thereby generating hot expanding exhaust gasses that cause the reciprocating movements of the piston. The fuel is injected into each cylinder by a respective fuel injector. The fuel is provided at high pressure to each fuel injector from a fuel rail in fluid communication with a high pressure fuel pump that increases the pressure of the fuel received from a fuel source. Operation of the internal combustion engine is generally controlled by one or more electronic control units (ECUs) operably coupled to an array of sensors and actuators associated with the internal combustion engine.

Due to stringent emissions regulation, internal combustion engines generally include exhaust gas after-treatment systems. An after-treatment system may include one or more after-treatment devices provided in an exhaust system of the internal combustion engine. For example, an after-treatment system may include an oxidation catalyst such as a diesel oxidation catalyst (DOC), that is, a device that utilizes a chemical process to break down compounds within the exhaust stream turning them into generally harmless components. DOCs may have a honeycomb shaped configuration coated in a catalyst designed to trigger the required chemical reaction. DOCs typically contain palladium (Pd) and platinum (Pt) or cerium oxide, which serve as catalysts to oxidize hydrocarbons and carbon monoxide into carbon dioxide and water. An alternative to DOC may be a three-way catalyst (TWC).

In a further alternative, a lean NOx trap (LNT) may be used. A LNT is a device that traps nitrogen oxides ($NO_x$) contained in the exhaust gas. More specifically, a LNT is a catalytic device containing catalysts, such as rhodium (Rh), Pt and Pd, and adsorbents, such as barium based elements, which provide active sites suitable for binding the nitrogen oxides ($NO_x$) contained in the exhaust gas, in order to trap them within the device itself.

After-treatment systems may also include a diesel particulate filter (DPF) which filters particulate matter (PM) from the exhaust gas and a selective catalytic reduction (SCR) device which is a catalytic device in which the nitrogen oxides ($NO_x$) contained in the exhaust gas are reduced into diatomic nitrogen ($N_2$) and water ($H_2O$), with the aid of a gaseous reducing agent, typically ammonia ($NH_3$) that can be obtained by urea ($CH_4N_2O$) thermo-hydrolysis and that is absorbed inside the SCR. Typically, urea is contained in a dedicated tank and is injected into and mixed with the exhaust gas flow upstream of the SCR. Other fluids can be used in a SCR in lieu of urea, any of which are generally referred to as diesel exhaust fluids (DEF). An alternative to the SCR is a SCRF (SCR on filter), that is, a device that combines in a single unit an SCR and a DPF.

The LNT, whether stand alone or in combination with an SCR, needs periodic cleaning. Cleaning of the LNT occurs in a process called regeneration, which is generally triggered automatically by the ECU when a threshold level of contaminants is detected in the LNT and additional operating parameters of vehicle are present. Regeneration may be provided by switching the engine from lean operation to rich operation, whereby excess fuel usually provided as a fuel after-injection in the exhaust gas is burned in the exhaust system raising the temperature of the exhaust gas.

Successful regeneration requires maintenance of the rich condition until regeneration is complete. Otherwise, the process must be repeated. Rich condition operation may be confirmed by observing a lambda (e.g., air-fuel ratio, oxygen, etc.) sensor output, and when, for example the lambda value is at or above a threshold value. However, during normal transient maneuvers, e.g., normal acceleration, to improve drivability and torque output and to reduce emissions output, such as soot production, the rich operation may be interrupted or may not be maintained as a result of the primary or main fuel injection quantity adjustment necessary to accommodate the transient maneuver.

SUMMARY

In accordance with the herein described exemplary embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The regeneration range comprises a rich operation range.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The controller is further configured to provide the after-injection quantity signal based upon a throttle position value.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The controller is further configured to provide the main injection quantity signal based upon a throttle position value.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The controller is an after-injection transform configured to provide a transformed lambda error signal, the after-injection quantity signal being based upon the transformed lambda error signal.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The controller is an after-injection proportional-integral transform configured to provide a transformed lambda error signal, the after-injection quantity signal being based upon the transformed lambda error signal.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The controller is a main injection transform configured to provide a transformed lambda error signal, the main injection quantity signal being based upon the transformed lambda error signal.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The controller is a main injection proportional-integral transform configured to provide a transformed lambda error signal, the main injection quantity signal being based upon the transformed lambda error signal.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The controller is an after-injection transform configured to provide a first transformed lambda error signal from the lambda error signal and a main injection transform configured to provide a second transformed lambda error signal from the lambda error signal different than the first transformed lambda error signal, the after-injection quantity signal being based upon the first transformed lambda error signal and the main injection error quantity being based upon the second transformed lambda error signal.

In accordance with further herein described embodiments, a control apparatus is provided for operating an internal combustion engine of a vehicle to provide regeneration of an after-treatment device associated with an exhaust system of the internal combustion engine. A lambda error control is configured to provide a lambda error signal based upon a measured lambda value and a predetermined lambda value that is indicative of rich operation. An after-injection map provides an after-injection preset based upon a speed of the internal combustion engine and a torque of the internal combustion engine, and a main injection map provides a torque making main injection preset based upon the speed of the internal combustion engine and the torque of the internal combustion engine. A controller is configured to provide an after-injection quantity signal based upon the after-injection preset and the lambda error signal and a main injection quantity signal based upon the main injection preset and the lambda error signal such that the measured lambda value is maintained within a regeneration range. The controller is an after-injection transform configured to provide a first transformed lambda error signal from the lambda error signal and a main injection transform configured to provide a second transformed lambda error signal from the lambda error signal different than the first transformed lambda error signal, the after-injection quantity signal being based upon the first transformed lambda error signal and the main injection error quantity being based upon the second transformed lambda error signal. The after-injection transform being a first proportional-integral transform and the main injection transform being a second proportional-integral controller different than the first proportional-integral transform.

In accordance with still further herein described embodiments, vehicle includes an internal combustion engine, an exhaust system associated with the internal combustion engine and an after-treatment device disposed in the exhaust system. A control apparatus is provided and includes a lambda error control configured to provide a lambda error signal based upon a measured lambda value and a predetermined lambda value. The predetermined lambda value is indicative of rich operation. An after-injection map is provided and is configured to provide an after-injection preset based upon a speed of the internal combustion engine and a torque of the internal combustion engine, and a main injection map is provided and is configured to provide a torque making main injection preset based upon the speed of the internal combustion engine and the torque of the internal combustion engine. A controller is provided and is configured to provide an after-injection quantity signal based upon the after-injection preset and the lambda error signal and a main injection quantity signal based upon the main injection preset and the lambda error signal. The after-injection quantity signal and the main injection quantity signal are such that the measured lambda value is maintained within a regeneration range.

In accordance with still further herein described embodiments, vehicle includes an internal combustion engine, an exhaust system associated with the internal combustion engine and an after-treatment device disposed in the exhaust system. A control apparatus is provided and includes a lambda error control configured to provide a lambda error signal based upon a measured lambda value and a predetermined lambda value. The predetermined lambda value is indicative of rich operation. An after-injection map is provided and is configured to provide an after-injection preset based upon a speed of the internal combustion engine and a torque of the internal combustion engine, and a main injection map is provided and is configured to provide a torque making main injection preset based upon the speed of the internal combustion engine and the torque of the internal combustion engine. A controller is provided and is configured to provide an after-injection quantity signal based upon the after-injection preset and the lambda error signal and a main injection quantity signal based upon the main injection preset and the lambda error signal. The after-injection quantity signal and the main injection quantity signal are such that the measured lambda value is maintained within a regeneration range. The predetermined lambda value is greater than 0.80.

In accordance with still further herein described embodiments, vehicle includes an internal combustion engine, an exhaust system associated with the internal combustion engine and an after-treatment device disposed in the exhaust system. A control apparatus is provided and includes a lambda error control configured to provide a lambda error signal based upon a measured lambda value and a predetermined lambda value. The predetermined lambda value is indicative of rich operation. An after-injection map is provided and is configured to provide an after-injection preset based upon a speed of the internal combustion engine and a torque of the internal combustion engine, and a main injection map is provided and is configured to provide a torque making main injection preset based upon the speed of the internal combustion engine and the torque of the internal combustion engine. A controller is provided and is configured to provide an after-injection quantity signal based upon the after-injection preset and the lambda error signal and a main injection quantity signal based upon the main injection preset and the lambda error signal. The after-injection quantity signal and the main injection quantity signal are such that the measured lambda value is maintained within a regeneration range. A throttle is associated with the internal combustion engine, and the controller is further configured to provide each of the after-injection quantity signals and the main injection quantity signal based upon a position of the throttle.

In accordance with still further herein described embodiments, vehicle includes an internal combustion engine, an exhaust system associated with the internal combustion engine and an after-treatment device disposed in the exhaust system. A control apparatus is provided and includes a lambda error control configured to provide a lambda error signal based upon a measured lambda value and a predetermined lambda value. The predetermined lambda value is indicative of rich operation. An after-injection map is provided and is configured to provide an after-injection preset based upon a speed of the internal combustion engine and a torque of the internal combustion engine, and a main injection map is provided and is configured to provide a torque making main injection preset based upon the speed of the internal combustion engine and the torque of the internal combustion engine. A controller is provided and is configured to provide an after-injection quantity signal based upon the after-injection preset and the lambda error signal and a main injection quantity signal based upon the main injection preset and the lambda error signal. The after-injection quantity signal and the main injection quantity signal are such that the measured lambda value is maintained within a regeneration range. The controller includes an after-injection transform configured to provide a first transformed lambda error signal and a main injection transform configured to provide a second transformed lambda error signal different than the first transformed lambda error signal, the after-injection quantity signal being based upon the first transformed lambda error signal and the main injection error quantity being based upon the second transformed error signal.

In accordance with still further herein described embodiments, vehicle includes an internal combustion engine, an exhaust system associated with the internal combustion engine and an after-treatment device disposed in the exhaust system. A control apparatus is provided and includes a lambda error control configured to provide a lambda error signal based upon a measured lambda value and a predetermined lambda value. The predetermined lambda value is indicative of rich operation. An after-injection map is provided and is configured to provide an after-injection preset based upon a speed of the internal combustion engine and a torque of the internal combustion engine, and a main injection map is provided and is configured to provide a torque making main injection preset based upon the speed of the internal combustion engine and the torque of the internal combustion engine. A controller is provided and is configured to provide an after-injection quantity signal based upon the after-injection preset and the lambda error signal and a main injection quantity signal based upon the main injection preset and the lambda error signal. The after-injection quantity signal and the main injection quantity signal are such that the measured lambda value is maintained within a regeneration range. The controller includes an after-injection transform configured to provide a first transformed lambda error signal and a main injection transform configured to provide a second transformed lambda error signal different than the first transformed lambda error signal, the after-injection quantity signal being based upon the first transformed lambda error signal and the main injection error quantity being based upon the second transformed error signal. The after-injection transform is a first proportional-integral transform and the main injection transform is a second proportional-integral controller different than the first proportional-integral transform.

In accordance with still further herein described embodiments, a method of regenerating an after-treatment device associated with an exhaust system of a vehicle including an internal combustion engine includes determining a lambda error based upon a measured lambda value and a predetermined lambda value. The predetermined lambda value is indicative of rich operation. An after-injection quantity signal is provided based upon the after-injection preset value and the lambda error and a main injection quantity signal is provided based upon the main injection preset and the lambda error. The after-injection quantity signal and the main injection quantity signal are such that the measured lambda value is maintained within a regeneration range.

In accordance with still further herein described embodiments, a method of regenerating an after-treatment device associated with an exhaust system of a vehicle including an internal combustion engine includes determining a lambda error based upon a measured lambda value and a predetermined lambda value. The predetermined lambda value is indicative of rich operation. An after-injection quantity signal is provided based upon the after-injection preset value and the lambda error and a main injection quantity signal is provided based upon the main injection preset and the lambda error. The after-injection quantity signal and the main injection quantity signal are such that the measured lambda value is maintained within a regeneration range. The measured lambda value is maintained at or above 0.80.

In accordance with still further herein described embodiments, a method of regenerating an after-treatment device associated with an exhaust system of a vehicle including an internal combustion engine includes determining a lambda error based upon a measured lambda value and a predetermined lambda value. The predetermined lambda value is indicative of rich operation. An after-injection quantity signal is provided based upon the after-injection preset value and the lambda error and a main injection quantity signal is provided based upon the main injection preset and the lambda error. The after-injection quantity signal and the main injection quantity signal are such that the measured lambda value is maintained within a regeneration range. The after-injection quantity signal and the main injection quantity signal are based upon a throttle position signal.

In accordance with still further herein described embodiments, a method of regenerating an after-treatment device associated with an exhaust system of a vehicle including an internal combustion engine includes determining a lambda error based upon a measured lambda value and a predetermined lambda value. The predetermined lambda value is indicative of rich operation. An after-injection quantity signal is provided based upon the after-injection preset value and the lambda error and a main injection quantity signal is provided based upon the main injection preset and the lambda error. The after-injection quantity signal and the main injection quantity signal are such that the measured lambda value is maintained within a regeneration range. The after-injection quantity signal and the main injection quantity signal are based upon a throttle position signal. The method further includes transforming the lambda error to provide a first transformed lambda error and a second transformed lambda error. Providing the after-injection quantity signal includes providing an after-injection quantity signal based upon the after-injection preset value and the first transformed lambda error, and providing a main injection quantity signal includes providing a main injection quantity signal based upon the main injection preset and the second transformed lambda error.

BRIEF DESCRIPTION OF THE DRAWINGS

The present disclosure will hereinafter be described in conjunction with the following drawing figures, wherein like numerals denote like elements.

DETAILED DESCRIPTION OF THE DRAWINGS

The following detailed description is merely exemplary in nature and is not intended to limit the present disclosure or the application and uses of the present disclosure. Furthermore, there is no intention to be bound by any theory presented in the preceding background or the following detailed description. Exemplary embodiments will now be described with reference to the drawings, wherein conventional or commonly known elements may be omitted for clarity.

Figure 1:
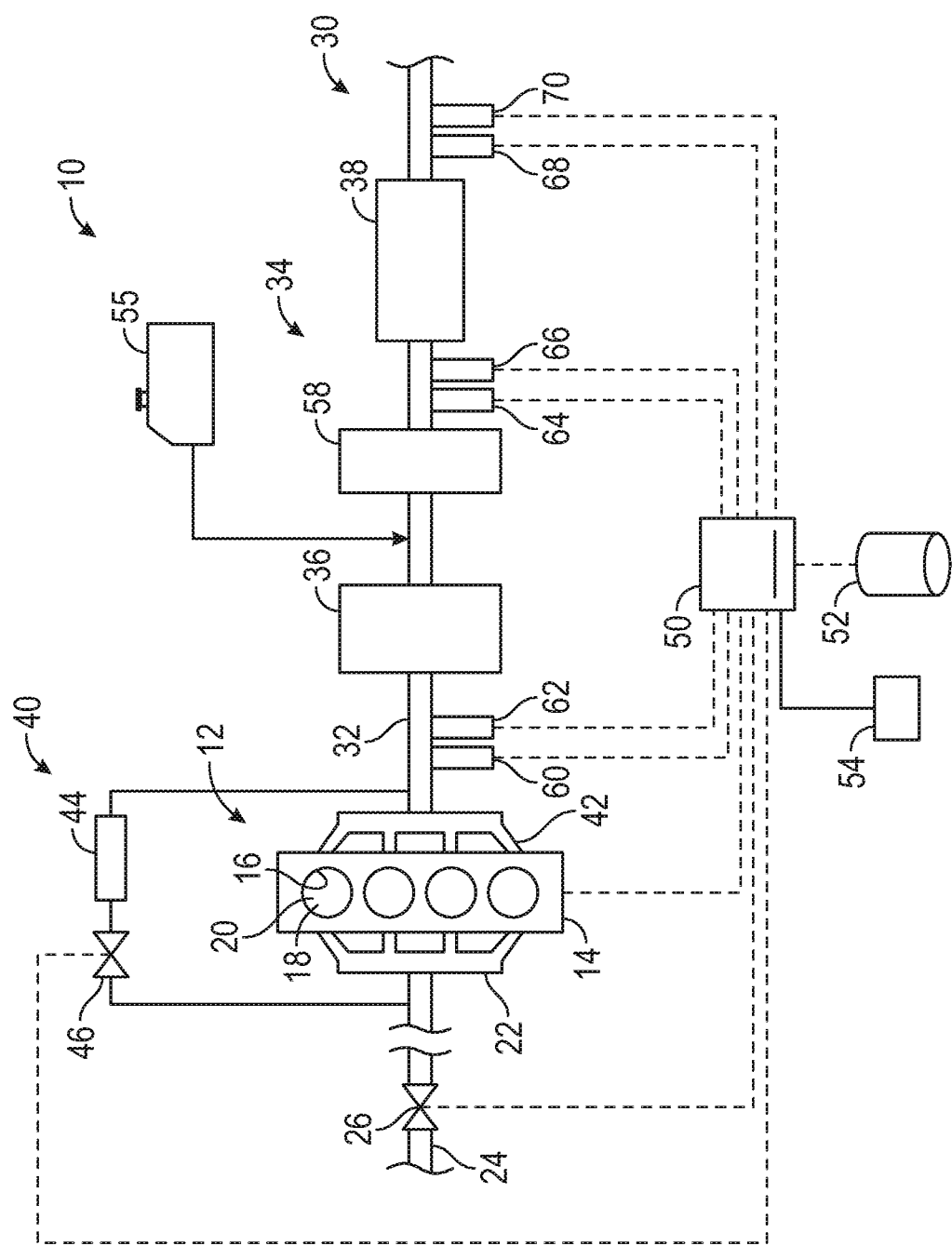
FIG. 1 is schematic representation of a vehicle incorporating an after-treatment system and an internal combustion engine that are operable in accordance with the herein described embodiments.

Some embodiments may include a vehicle 10, as shown in FIG. 1 that includes an internal combustion engine (ICE) 12 having an engine block 14 defining at least one cylinder 16 having a piston 18 coupled to rotate a crankshaft. A cylinder head cooperates with the piston 18 to define a combustion chamber 20. A fuel and air mixture is disposed in the combustion chamber 20 and ignited, resulting in hot expanding exhaust gasses causing reciprocal movement of the piston 18. The fuel is provided by at least one fuel injector and the air through at least one intake port from an intake manifold 22. The fuel is provided at high pressure to the fuel injector from a fuel rail in fluid communication with a high-pressure fuel pump that increases the pressure of the fuel received from a fuel source. Each of the cylinders 16 has at least two valves, actuated by a camshaft rotating in time with the crankshaft. The valves selectively allow air into the combustion chamber 20 and alternately allow exhaust gas to exit through an exhaust port.

The air may be distributed to the air intake port(s) through the intake manifold 22. An air intake duct 24 may provide air from the ambient environment to the intake manifold 22. In other embodiments, a throttle body 26 may be provided to regulate the flow of air into the manifold 22. In still other embodiments, a forced air system such as a turbocharger having a compressor rotationally coupled to a turbine may be provided. Rotation of the compressor increases the pressure and temperature of the air in the duct 24 and manifold 22, and an optional intercooler disposed in the duct 24 may be provided to reduce the temperature of the air.

The exhaust system 30 may include an exhaust pipe 32 having an after-treatment system 34 including one or more exhaust after-treatment devices. The after-treatment devices may be any device configured to change the composition of the exhaust gas. Some examples of after-treatment devices include, but are not limited to, catalytic converters (two and three way), such as diesel oxidation catalyst (DOC), lean NOx traps, hydrocarbon adsorbers and selective catalytic reduction (SCR) systems, depicted generally as device 36. The after-treatment system 34 may further include a diesel particular filter (DPF) 38, which may be combined with the SCR to provide an SCRF system. Other embodiments may include an exhaust gas recirculation (EGR) system 40 coupled between the exhaust manifold 42 and the intake manifold 22. The EGR system 40 may include an EGR cooler 44 to reduce the temperature of the exhaust gases in the EGR system 40. An EGR valve 46 regulates a flow of exhaust gases in the EGR system 40.

Upstream of the DPF 38, a urea injection system is provided, the urea injection system including a urea tank 55 and a urea injector 56. Urea is injected in a point upstream of a urea mixer 58 that mixes the urea injected with the exhaust gas stream. An air-to-fuel ratio sensor (or lambda sensor) 60 and an exhaust temperature sensor 62 are provided upstream of the device 36. Furthermore, an air-to-fuel ratio sensor 64 and an exhaust temperature sensor 66 are provided downstream of the device 36. Downstream of the DPF 38, a $NO_x$ sensor 68 and a particulate matter (PM) sensor 70 are provided.

The vehicle 10 may further include an electronic control unit (ECU) 50 in communication with one or more sensors and/or devices associated with the ICE 12. The ECU 50 may receive input signals from various sensors configured to generate the signals in proportion to various physical parameters associated with the ICE 12. The sensors include, but are not limited to, a mass airflow and temperature sensor, a manifold pressure and temperature sensor, a combustion pressure sensor, coolant and oil temperature and level sensors, a fuel rail pressure sensor, a cam position sensor, a crank position sensor, an exhaust pressure sensor and an exhaust temperature sensor, an EGR temperature sensor, and an accelerator pedal position sensor. Furthermore, the ECU 50 may generate output signals to various control devices that are arranged to control the operation of the ICE 12, including, but not limited to, the fuel injectors, the throttle body 26 and the EGR valve 46. Dashed lines depicted in FIG. 1 are used to indicate communication between the ECU 50 and the various sensors and devices, but some are omitted for clarity.

Turning now to the ECU 50, this apparatus may include a digital central processing unit (CPU) in communication with a memory system 52, and an interface bus. The CPU is configured to execute instructions stored as a program in the memory system 52, and to send and receive signals to/from the interface bus. The memory system 52 may include various storage types including optical storage, magnetic storage, solid-state storage, and other non-volatile memory. An operator interface 54, such as an interactive driver information center (DIC), touch screen interface, or any one or combination of display, switches and buttons (not depicted) to provide information to the operator and to accept input from the operator, is operably coupled to the ECU 50. The interface bus may be configured to send, receive, and modulate analog and/or digital signals to/from the various sensors, control devices and the operator interface 54. The program may embody the methods disclosed herein, allowing the CPU to carryout the steps of such methods and to control the ICE 12.

The program stored in the memory system may be transmitted from outside via a cable or in a wireless interface. Outside the vehicle 10 it is normally visible as a computer program product, which is also called computer readable medium or machine readable medium, and which should be understood to be a computer program code residing on a carrier, whether transitory or non-transitory in nature, with the consequence that the computer program product can be regarded to be transitory or non-transitory in nature.

An example of a transitory computer program product is a signal, e.g. an electromagnetic signal, which is a transitory carrier for the computer program code. Carrying such computer program code can be achieved by modulating the signal by a conventional modulation technique for digital data, such that binary data representing the computer program code is impressed on the transitory electromagnetic signal. Such signals may be made use of when transmitting computer program code in a wireless fashion via a WiFi connection from/to a laptop computer or other computing device.

In the case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an application specific integrated circuit (ASIC), a CD or DVD or the like.

Instead of an ECU 50, the vehicle 10 may have a different type of processor to provide the electronic logic, e.g. an embedded controller, an onboard computer, or any processing module that might be deployed in the vehicle.

Figure 2:
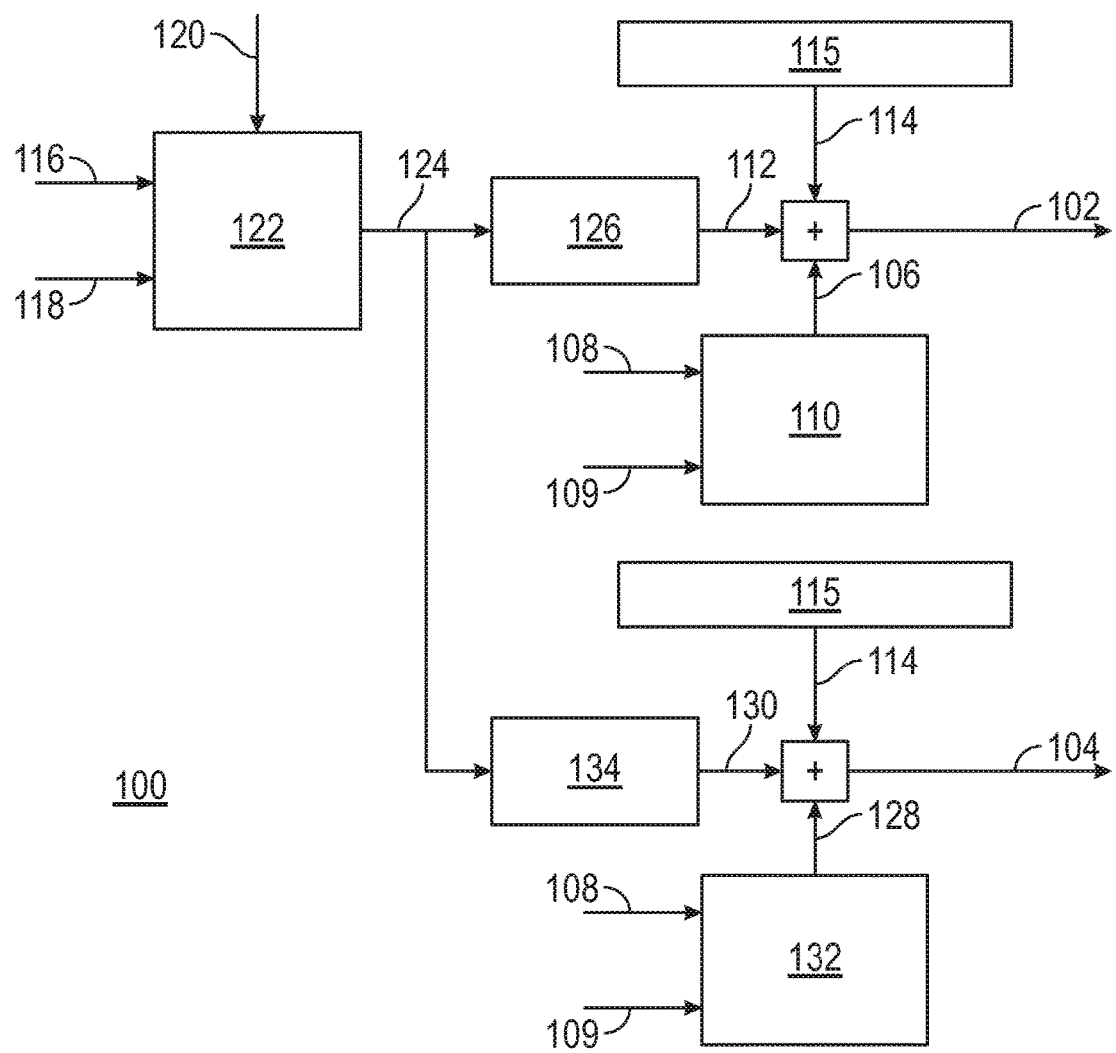
FIG. 2 is a functional block diagram illustration of a controller for operating an internal combustion engine in accordance with the herein described embodiments.

During LNT regeneration, the ECU 50 causes the vehicle 10 to operate in such a way to switch the ICE 12 from a lean operation to a rich operation. This operation may be implemented without operator intervention when it is determined regeneration is required by algorithms presents in ECU 50 and when operating engine operating boundary conditions permit regeneration, FIG. 2 illustrates in functional block form a controller 100 of the ECU 50 to provide after-treatment regeneration. The controller 100 is configured to provide an after-injection quantity signal 102 and a main injection quantity signal 104, which are operable coupled to the fuel injectors to provide an after-injection fuel quantity and a main fuel injection quantity.

To provide the after-injection quantity signal 102, an after-injection preset signal 106 is provided based upon an engine speed 108, an engine torque 109 and an after-injection preset or after-injection quantity map 110. The after-injection preset signal 106 is combined with a lambda error gain signal 112 and a throttle position signal 114 from a throttle position sensor 115 to provide the after-injection quantity signal 102.

The lambda error gain signal 112 is based upon a desired lambda signal 116, a measured lambda signal 118 and a measured air mass signal 120, which are provided to an error calculation 122, which provides an error signal 124 representing an air mass compensated lambda error signal. The error signal 124 is an input to a control 126. The control 126 may be any suitable transform control, such as a proportional, integral, differential and combinations thereof, type control transform function. The control 126 provides the lambda error gain signal 112.

Rich operation of the ICE 12 requires the lambda value, i.e., a regeneration lambda value, to be greater than a threshold value, for example, lambda >0.80 (greater than 0.80), and preferentially lambda ≥0.95 (greater than or equal to 0.95). Moreover, the regeneration lambda value must be maintained for the entire regeneration period, which may be a fixed period of time, based upon a measured NOx content of a LNT or by any suitable manner of determining that the regeneration is complete.

As described, the controller 100 is operable during regeneration to control the lambda value within a suitable regeneration range. However, during transient operation, as a result of the main fuel injection quantity, the lambda value may be caused to depart from the acceptable range for regeneration notwithstanding attempts by the controller 100 to control the lambda value to remain within the regeneration range.

The main injection quantity control 106 is based upon a main injection quantity map signal 128, the throttle position signal 114 and a lambda error gain signal 130, which may be different than the lambda error gain signal 112. The main injection quantity map signal 128 is based upon the engine speed 108 and the engine torque 109 and utilizing a preset or main injection quantity map 132. The error signal 124 is provided to a control 134, which may be any suitable transform control, such as a proportional, integral, differential and combinations thereof, type control transform function. The control 134 provides the lambda error gain signal 130.

The arrangement of the controller 100, provides for control of both an after-injection fuel quantity via an after-injection quantity signal 102 and a main injection fuel quantity via a main injection quantity signal 104, both of which being based upon a lambda error signal 124. As a result, the after-injection fuel quantity and the main injection fuel quantity are determined such that during regeneration the lambda value is maintained within the regeneration range.

Figure 3:
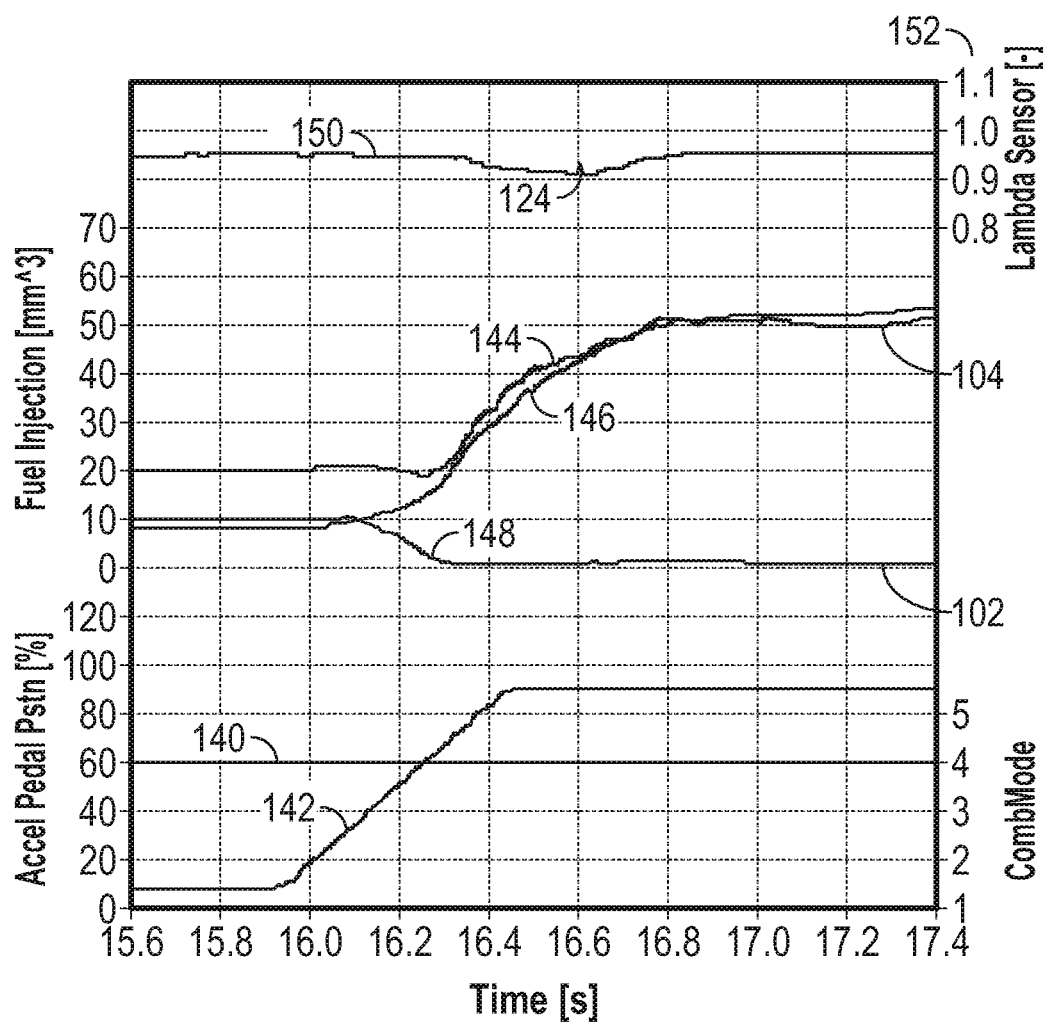
FIG. 3 is a chart depicting operation of an internal combustion engine in accordance with the herein described embodiments.

FIG. 3 depicts graphically a transient maneuver during a regeneration process. As depicted, during a rich operation mode 140 to provide regeneration, a change in throttle position 142 requests a torque making fuel quantity 144 be provide to the ICE 12. Correspondingly, the main injection fuel quantity 104 is increased 146, and the after-injection fuel quantity 102 is decreased 148. A result is that the lambda value 150 drops creating the lambda error signal 124. However, by operation of the controller 100 taking into account the lambda error signal 124, the main injection fuel quantity is maintained such that the lambda value 150 remains within the regeneration range 152 until the regeneration process is completed, or other conditions occur to terminate regeneration.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A control apparatus for operating an internal combustion engine of a vehicle to provide regeneration of an after-treatment device associated with an exhaust system of the internal combustion engine, the control apparatus comprising:

a lambda error control configured to provide a lambda error signal based upon a measured lambda value and a predetermined lambda value, the predetermined lambda value being indicative of rich operation;

an after-injection map configured to provide an after-injection preset based upon a speed of the internal combustion engine and a torque of the internal combustion engine;

a main injection map configured to provide a torque making main injection preset based upon the speed of the internal combustion engine and the torque of the internal combustion engine;

a controller configured to provide an after-injection quantity signal based upon the after-injection preset and the lambda error signal and a main injection quantity signal based upon the main injection preset and the lambda error signal; and wherein, the after-injection quantity signal and the main injection quantity signal are such that the measured lambda value is maintained within a regeneration range.

2. The control apparatus of claim 1, wherein the predetermined lambda value is greater than 0.80.

3. The control apparatus of claim 1, wherein the regeneration range comprises a rich operation range.

4. The control apparatus of claim 1, wherein the controller is further configured to provide the after-injection quantity signal based upon a throttle position value.

5. The control apparatus of claim 1, wherein the controller is further configured to provide the main injection quantity signal based upon a throttle position value.

6. The control apparatus of claim 1, the controller comprising an after-injection transform configured to provide a transformed lambda error signal based upon the transformed lambda error signal.

7. The control apparatus of claim 6, the after-injection transform being a proportional-integral transform.

8. The control apparatus of claim 1, the controller comprising a main injection transform configured to provide a transformed lambda error signal based upon the transformed lambda error value.

9. The control apparatus of claim 8, the main injection transform being a proportional-integral transform.

10. The control apparatus of claim 1, the controller comprising an after-injection transform configured to provide a first transformed lambda error signal from the lambda error signal and a main injection transform configured to provide a second transformed lambda error signal from the lambda error signal different than the first transformed lambda error signal, the after-injection quantity signal being based upon the first transformed lambda error signal and the main injection error quantity being based upon the second transformed lambda error signal.

11. The control apparatus of claim 10, the after-injection transform being a first proportional-integral transform and the main injection transform being a second proportional-integral controller different than the first proportional-integral transform.

12. A vehicle comprising:
an internal combustion engine,
an exhaust system associated with the internal combustion engine,
an after-treatment device disposed in the exhaust system, and
a control apparatus comprising:
a lambda error control configured to provide a lambda error signal based upon a measured lambda value and a predetermined lambda value, the predetermined lambda value being indicative of rich operation;
an after-injection map configured to provide an after-injection preset based upon a speed of the internal combustion engine and a torque of the internal combustion engine;
a main injection map configured to provide a torque making main injection preset based upon the speed of the internal combustion engine and the torque of the internal combustion engine;

a controller configured to provide an after-injection quantity signal based upon the after-injection preset and the lambda error signal and a main injection quantity signal based upon the main injection preset and the lambda error signal; and wherein, the after-injection quantity signal and the main injection quantity signal are such that the measured lambda value is maintained within a regeneration range.

13. The vehicle of claim 12, wherein the predetermined lambda value is greater than 0. 80.

14. The vehicle of claim 12, a throttle being associated with the internal combustion engine, and wherein the controller is further configured to provide each of the after-injection quantity signal and the main injection quantity signal based upon a position of the throttle.

15. The vehicle of claim 12, the controller comprising an after-injection transform configured to provide a first transformed lambda error signal and a main injection transform configured to provide a second transformed lambda error signal different than the first transformed lambda error signal, the after-injection quantity signal being based upon the first transformed lambda error signal and the main injection error quantity being based upon the second transformed error signal.

16. The control apparatus of claim 15, the after-injection transform being a first proportional-integral transform and the main injection transform being a second proportional-integral controller different than the first proportional-integral transform.

17. A method of regenerating an after-treatment device associated with an exhaust system of a vehicle including an internal combustion engine, the method comprising:
determining a lambda error based upon a measured lambda value and a predetermined lambda value, the predetermined lambda value being indicative of rich operation;
providing an after-injection quantity signal based upon the after-injection preset value and the lambda error and a main injection quantity signal based upon the main injection preset and the lambda error; and wherein,
the after-injection quantity signal and the main injection quantity signal are such that the measured lambda value is maintained within a regeneration range.

18. The method of claim 17, wherein the measured lambda value is maintained at or above 0.80.

19. The method of claim 17, further comprising providing each of the after-injection quantity signal and the main injection quantity signal based upon a throttle position signal.

20. The method of claim 17, further comprising transforming the lambda error to provide a first transformed lambda error and a second transformed lambda error, and wherein,
providing an after-injection quantity signal comprises providing an after-injection quantity signal based upon the after-injection preset value and the first transformed lambda error, and
providing a main injection quantity signal comprises providing a main injection quantity signal based upon the main injection preset and the second transformed lambda error.

* * * * *